J. HINTON.
Clover Harvester.
No. 173. Reissued Aug. 13, 1850.
Fig. 1,
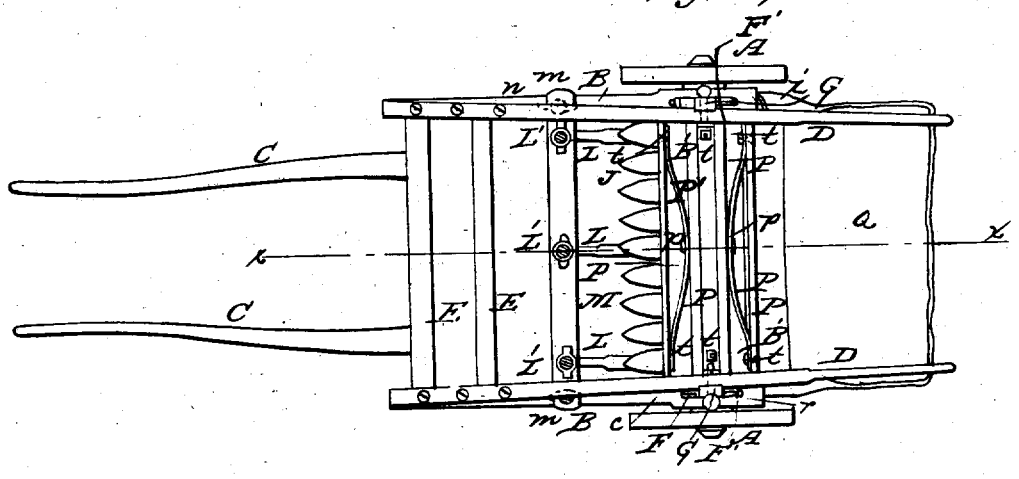
Fig. 2,
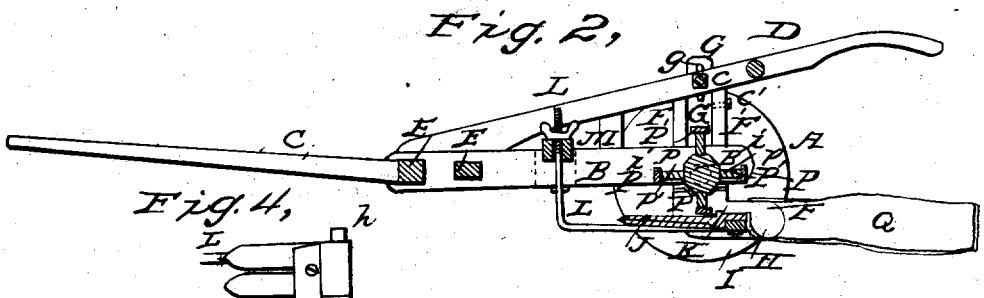
Fig. 4,
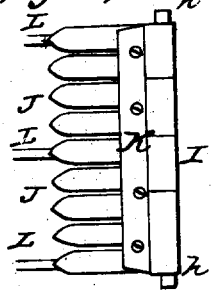
Fig. 3,
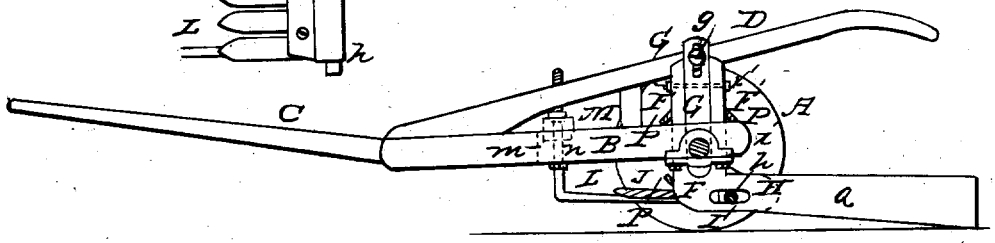
N. PETERS. Photo-Lithographer. Washington, D. C.

UNITED STATES PATENT OFFICE.

JOHN HINTON, OF NEAR PACK'S FERRY, VIRGINIA.

IMPROVEMENT IN HARVESTERS OF CLOVER-HEADS AND OTHER GRAIN.

Specification forming part of Letters Patent No. 6,475, dated May 22, 1849; Reissue No. 173, dated August 13, 1850.

*To all whom it may concern:*

Be it known that I, JOHN HINTON, of near Pack's Ferry, in the county of Monroe and State of Virginia, have invented certain new and useful Improvements in Machines for Cutting and Gathering the Heads of Clover, Wheat, Rye, Oats, Barley, Rice, and other Descriptions of Grain; and I do hereby declare the following to be a full and clear description thereof, reference being had to the annexed drawings of the same, making part of this specification, the letters of reference used in the specification and marked on the several figures of the drawings indicating the the same parts where they occur.

Figure 1 is a plan or top view of the machine. Fig. 2 is a longitudinal section on the line *x x* of Fig. 1. Fig. 3 is an elevation, the left wheel being removed. Fig. 4 is a plan of the fingers and knife.

The nature of my invention and improvement consists in a novel combination and arrangement of an adjustive pendent bar, to which is secured a row of parallel metallic fingers and a knife or cutter and right-angled mortised plates, and in the arrangement of spring conveyer-bars attached to the axle-tree of the propelling-wheels, and rotating with the same, by which the stems or stalks of clover, wheat, or other grain are carried rearward against the knife, between the parallel fingers, severed, and conveyed into the receiver while the machine is progressing.

A A are the supporting and propelling wheels.

B B are the side timbers of the frame, in the rear ends of which are the bearings of the axle-tree B′.

C C are the shafts by which the animal or animals for drawing the machine are geared.

D D are the handles by which the machine is guided and lifted when turning angles.

E E are beams of timber which connect the front ends of the side timbers. These parts are made and arranged in any convenient and suitable way.

F F are two mortised right-angled plates, in which are secured the journals of the pendent finger-bar. The vertical portions F′ of these plates project up through mortises *i* in the side timbers, and are open or slotted vertically to receive adjustive bars G, to which they are secured.

G G are vertical adjustive slides or bars, having mortises *g g* in their upper ends, through which bars and the handles D D screw-bolts *c c* are passed to receive nuts on their inner ends, by which said right-angled plates F are raised or lowered and held in any required position. The lower ends of the adjustive slides or bars G enter mortises *i* in the side timbers, and are susceptible of being raised or lowered with the right-angled plates and fingers to suit the height of the heads of clover, wheat, or other grain, the plates F′ being connected to the adjustive slides or bars G by bolts *c′ c′*.

H H are oblong mortises in the lower or horizontal portions of the right-angled plates F to receive and confine the journals *h h* of the pendent bar I, and allow the same, with the knife K and fingers J, to have a movement lengthwise the frame, or toward its front, in order to bring the knife K nearer to or farther from the direct action of the spring-conveyer-bars in forcing or carrying the stems or stalks of the clover or wheat, &c., against the knife.

I is a transverse pendent finger-bar secured beneath and parallel with the axle-tree to the right-angled plates F, which support and allow it to move back and forth in the mortises H upon its journals *h h*.

J are the metallic fingers, made in sections, pointed and projecting in front beyond the sweep of the conveyer-bars, and are fastened to the transverse pendent bar I by screw-bolts and nuts.

K is a blade or knife embedded or countersunk in the top of the fingers and screwed firmly to the same, so as to permit the spring conveyer-bars P to pass over successively without coming in contact with the cutting-edge of the knife, which is next to the points of the fingers.

L L are right-angled rods screwed to the under side of the pendent bar I, and extending in front of the fingers and vertically through openings in a transverse timber, M. On the vertical portions of these rods L are formed screws to receive nuts L′, which rest on the transverse timber M, for raising or lowering the finger-points J when the pendent bar is raised or lowered, or independent of the pendent bar.

M is a transverse timber, through which the vertical portions of the rods L pass, secured on the side timbers, B, by screw-bolts *m*, passed through mortises *n* in the same, on the lower ends of which are screwed nuts, by which said timber M is allowed to move with the fingers J and pendent bar I to or from the axle-tree B′ in order to bring the cutting-edge of the knife K nearer to or farther from the action of the spring conveyer-bars.

P P are the spring conveyer-bars, arranged at equal distances apart around the axle-tree B′, and are the length of the same between the side timbers, B B, four of which being sufficient for an operative machine, though more may be used if found necessary. These conveyer-bars P are made of wood or other material, and are secured to the ends of springs P′ by screw-bolts *t*, the nuts of which are countersunk in the bars, so as not to come in contact with the knife, the center of the springs P′ P′ being screwed to the axle-tree by bolts *p*, and are provided with slits in their ends, in which the bolts move, to allow the springs P′ to contract as the said conveyer-bars P rotate over the knife K to sever the stems or stalks of the heads of clover, wheat, &c.

Q is a receiver into which the heads of clover, wheat, &c., are conveyed after being severed from the stems or stalks. This receiver is fastened to the lower or horizontal portions of the right-angled plates in the rear of the machine, and is made of any suitable material, such as rawhide or leather. The handles D are sufficiently braced and supported by posts to sustain the plates F and finger-bar I.

The operation of the machine will be evident from the foregoing description. The animal or animals of draft being attached to the shafts, and the fingers J, with the knife K, adjusted to the height of the heads of clover, wheat, or other grain to be cut, the stems or stalks of the clover, wheat, &c., are received between the fingers against the transverse blade or knife K. The heads of the clover, wheat, &c., which are above the fingers are struck and carried by the conveyer-bars against the blade or knife and severed and conveyed into the receiver *q*.

The machine may be propelled by steam or any adequate power.

Having thus described my invention and improvements on the machine for harvesting the heads of grain, what I claim as my improvement, and desire to secure by Letters Patent, is—

1. The combination and arrangement of the transverse pendent finger-bar I, the mortised right-angled plates F, the adjustive slide-bars G, and knife or cutter K with the revolving axle-tree of spring conveyer-bars P, arranged and operating in the manner described, by which the heads of clover, wheat, and other descriptions of grain are severed from the stems or stalks and delivered into a receiver.

2. The combination of the right angled rods L, fingers J, and pendent bar I with the transverse timber M, for adjusting the knife K and fingers J longitudinally and vertically, in connection with the spring conveyer-bars P, as described and represented.

In testimony whereof I have hereunto signed my name before two subscribing witnesses.

JOHN HINTON.

Witnesses:
WM. P. ELLIOT,
A. E. H. JOHNSON.